C. D. GIBSON.
CHANGE SPEED GEARING.
APPLICATION FILED DEC. 1, 1916.
1,242,678.
Patented Oct. 9, 1917.
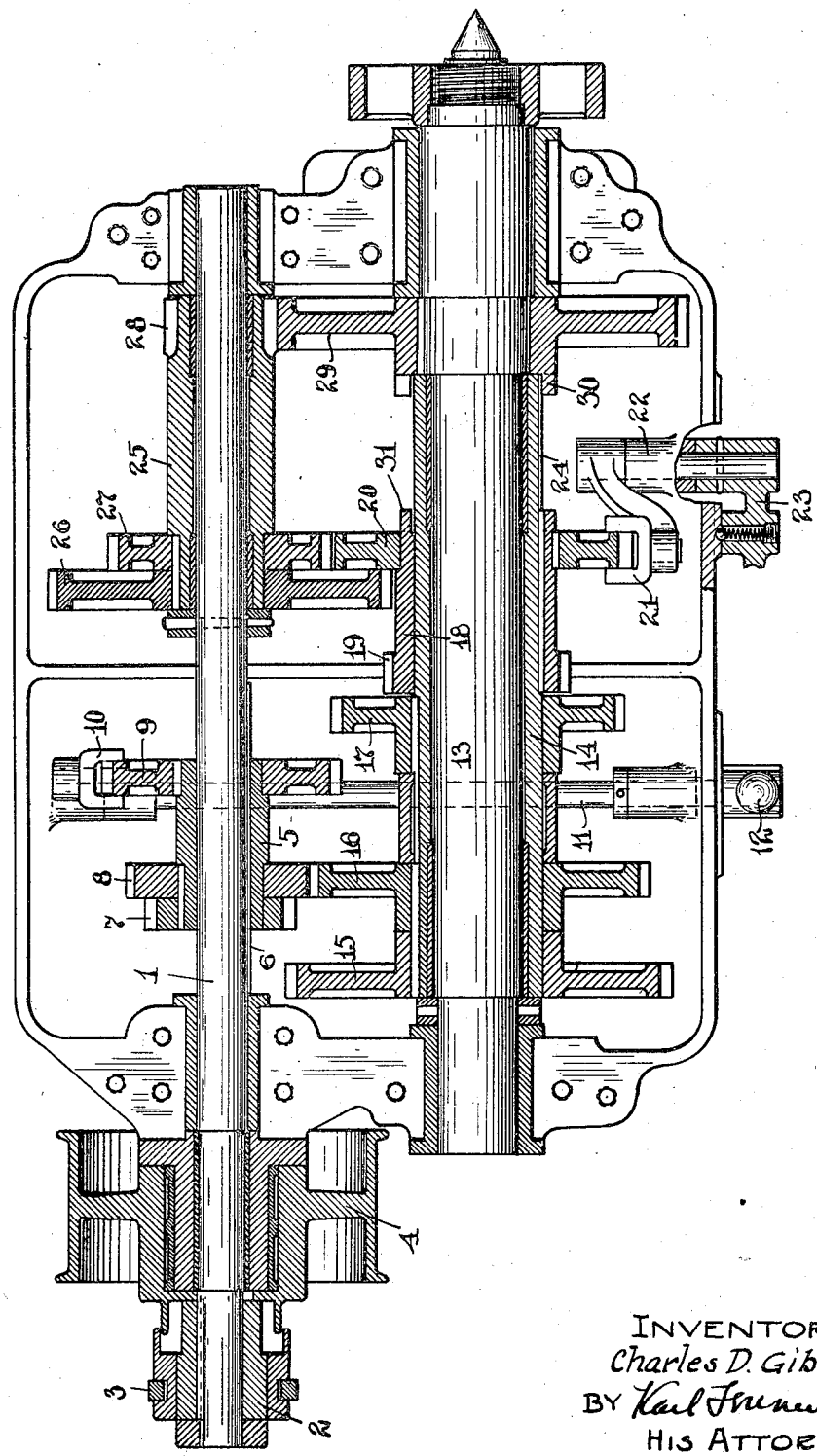
INVENTOR
Charles D. Gibson.
BY Karl Freuwg
HIS ATTORNEY.

UNITED STATES PATENT OFFICE.

CHARLES D. GIBSON, OF CLEVELAND, OHIO, ASSIGNOR TO THE SIMPLEX MACHINE TOOL COMPANY, A CORPORATION OF OHIO.

CHANGE-SPEED GEARING.

1,242,678.       Specification of Letters Patent.       Patented Oct. 9, 1917.

Application filed December 1, 1916. Serial No. 134,343.

*To all whom it may concern:*

Be it known that I, CHARLES D. GIBSON, a citizen of the United States, residing at Cleveland, Ohio, have invented certain new and useful Improvements in Change-Speed Gearing, of which the following is a specification.

My invention relates to mechanism by which movement is given to the spindle of a lathe and includes mechanism for effecting various speeds of rotation of the spindle from a pulley driven at constant speed.

In the particular embodiment of my invention illustrated I have shown a back shaft which carries a clutch to engage a pulley and which has keyed to it a group of gears which may be caused to selectively coöperate with one or another gear in a group of gears which in turn is carried on a sleeve turning about the lathe spindle. Associated with the last named group and turning therewith about the lathe spindle, is another group of gears which may be caused to selectively coöperate with one or another of a group of gears mounted to turn freely around the lathe back shaft. Associated with the last named group and turning with it about the back shaft, is an additional gear which is in permanent engagement with a gear carried on and driving the spindle. The gear on the spindle also has associated with it one clutch member which may be engaged by a clutch associated with the second group of gears rotating about the spindle.

In the accompanying drawing, I have shown a horizontal sectional view of my head-stock. The back shaft 1 carries at one end a clutch 2 which may be operated by the usual fork 3 to engage a pulley 4 which is normally free to rotate in bearings about the back shaft. A sleeve 5 is keyed at 6 to the back shaft and carries a group of gears 7, 8 and 9. A fork 10 operated in the usual way by a rod 11 and handle 12 engages the gear 9 in such a way as to move the group of gears 7, 8 and 9 along the back shaft within the limits of the key 6. Mounted to rotate freely about the spindle 13 is a sleeve 14 which carries a group of gears 15, 16 and 17 keyed thereto. Also carried by the sleeve 14 and keyed thereto at 24 is a sleeve 18 carrying a group of gears 19 and 20. The gear 20 is engaged by a fork 21 operated in the usual manner by a rod 22 and a handle 23 to reciprocate the group of gears 19 and 20 longitudinally along the spindle within the limits of the key 24. Rotating freely about the back shaft 1 is a sleeve 25 carrying a group of gears 26 and 27 and also a gear 28 which latter gear is in permanent engagement with a gear 29 mounted to rotate with the spindle 13. The gear 29 is provided with a clutch member 30. The other member 31 of the clutch is associated with the gears 19 and 20 on the sleeve 18 and may be reciprocated with them.

When the fork 3 is operated to cause the clutch 2 to engage the pulley 4 and the pulley is driven by the usual belt the back shaft 1 will be rotated and will rotate with it the group of gears 7, 8 and 9. In the position shown the gear 8 will engage the gear 16 of the group 15, 16, 17 which rotate the sleeve 14 on which is the group of gears 19 and 20 as well as the portion 31 of the clutch. In the position shown the gear 20 is in engagement with the gear 27 of the group 26, 27 carried on the sleeve 25 loose on the back shaft which sleeve also carries the gear 28 which being in engagement with the gear 29 on the spindle will rotate the spindle. The relative sizes of the gears 7 and 15 is different from the relation between the gears 8 and 16 and the relation between the gears 9 and 17. In like manner, the relative sizes of the gears 19 and 26 is different from the relation of the gears 20 and 27. The fork 10 may be manipulated to move the gears 8 and 16 out of engagement and place the gears 7 and 15 in engagement or the gears 9 and 17 in engagement thus changing the speed of the spindle. In like manner the fork 21 may be manipulated to withdraw the gears 20 and 27 out of engagement and place the gears 19 and 26 in engagement thus again varying the speed of the spindle, or the fork 21 may throw into engagement the clutch member 30 and 31 and thus drive the spindle at a different speed.

Although the exact details of the apparatus shown in the drawing are not essential to my invention, it will be seen that I have provided means for producing nine different speeds of the spindle from a constant speed in the pulley 4, namely, (1) Through the gears 7, 15, 19, 26, 28 and 29.

(2) Through the gears 8, 16, 19, 26, 28 and 29.

(3) Through the gears 9, 17, 19, 26, 28 and 29.
(4) Through the gears 7, 15, 20, 27, 28 and 29.
(5) Through the gears 8, 16, 20, 27, 28 and 29.
(6) Through the gears 9, 17, 20, 27, 28 and 29.
(7) Through the gears 7, 15 and the clutch 30, 31.
(8) Through the gears 8, 16 and the clutch 30, 31.
(9) Through the gears 9, 17 and the clutch 30, 31.

The various speeds are effected by manipulation of two forks and after they are set for one speed or another the apparatus may be put in motion at the selected speed by the operation of a clutch.

I claim as my invention:

1. In a headstock for lathes, a back shaft, a pulley loose on the back shaft, a clutch for engaging the pulley and back shaft, a sleeve keyed to the back shaft but having longitudinal movement thereon, three gears of different diameters on the sleeve, a spindle, a sleeve loose on the spindle, three gears of different diameters on the sleeve on the spindle, a fork engaging one of the gears on the sleeve on the back shaft to reciprocate said sleeve and cause one or another of the gears on said sleeve to engage one or another of the gears on the sleeve on the spindle, a sleeve keyed to but reciprocating on the sleeve on the spindle, two gears and a clutch on the last named sleeve, a fork engaging one of the gears to reciprocate the sleeve, a sleeve loose on the back shaft, two gears on the last named sleeve to engage one or the other of the gears on the sleeve keyed to the sleeve on the spindle, a third gear on the sleeve loose on the back shaft, a gear on the spindle engaging the said third gear, a clutch on the spindle engaging the clutch on the sleeve keyed to the sleeve on the spindle when it is thrown in one direction by its fork.

2. In a headstock for lathes, a back shaft, means for rotating the back shaft, a sleeve keyed to the back shaft but having longitudinal movement thereon, a group of gears on the sleeve, a spindle, a sleeve loose on the spindle, a group of gears on the sleeve on the spindle, a fork to reciprocate the sleeve on the back shaft and cause one or another of the gears on said sleeve to engage one or another of the gears on the sleeve on the spindle, a sleeve keyed to but reciprocating on the sleeve on the spindle, a group of gears and a clutch on the last named sleeve, a fork to reciprocate the sleeve, a sleeve loose on the back shaft, a group of gears on the last named sleeve to engage one or another of the gears on the sleeve keyed to the sleeve on the spindle, a gear on the sleeve loose on the back shaft, a gear on the spindle engaging the said gear, a clutch on the spindle engaging the clutch on the sleeve keyed to the sleeve on the spindle when it is thrown in one direction by its fork.

3. In a headstock for lathes, a back shaft, a pulley on the back shaft, a group of gears keyed to the back shaft, a spindle, a group of gears loose on the spindle, a fork engaging one of the gears keyed to the back shaft to reciprocate the group and cause one or another of the gears to engage one or another of the group of gears loose on the spindle, a group of gears and a clutch keyed to the gears loose on the spindle, a fork engaging one of the gears to reciprocate the group and clutch, a group of gears loose on the back shaft to engage one or another of the group of gears keyed to the gears loose on the spindle, a gear associated with the group loose on the back shaft, a gear on the spindle engaging the said gear, a clutch on the spindle engaging the clutch associated with the group of gears keyed to the gears loose on the spindle when it is thrown in one direction by its fork.

C. D. GIBSON.

Copies of this patent may be obtained for five cents each, by addressing the "Commissioner of Patents, Washington, D. C."